Figure 1:
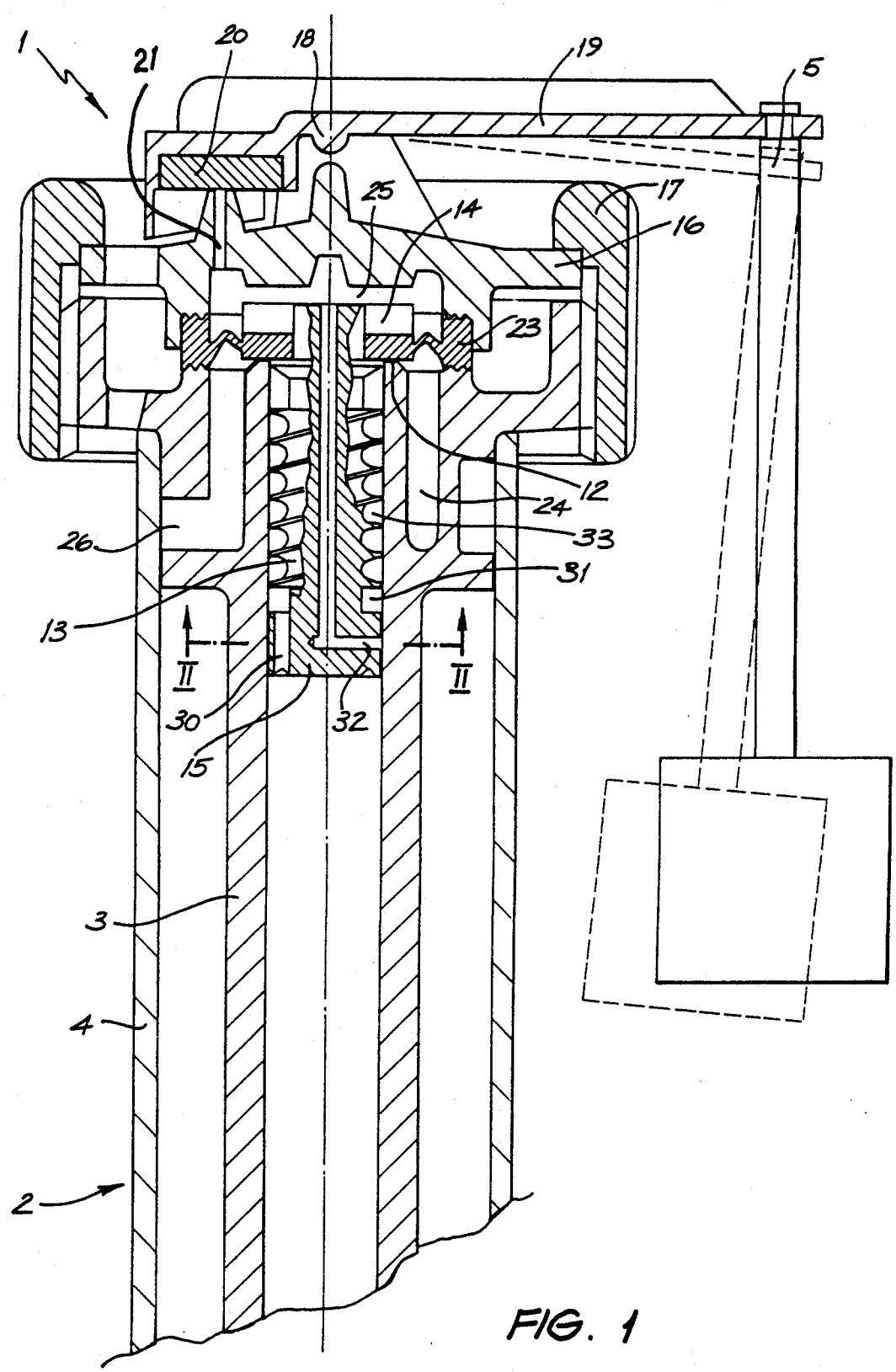

United States Patent [19]

Swift et al.

[11] Patent Number: 5,280,803
[45] Date of Patent: Jan. 25, 1994

[54] A VALVE ARRANGEMENT

[75] Inventors: David B. Swift, West Lakes; David Chelchowski, Larges Bay, both of Australia

[73] Assignee: Caroma Industries Limited, Brisbane, Australia

[21] Appl. No.: 743,104

[22] Filed: Aug. 9, 1991

[30] Foreign Application Priority Data

Aug. 9, 1990 [AU] Australia .................. PK1661

[51] Int. Cl.⁵ .................. F16K 31/34; F16K 31/126
[52] U.S. Cl. .................. 137/414; 137/426; 137/436; 137/437; 137/443; 137/444; 251/126
[58] Field of Search ............... 137/414, 432, 434, 436, 137/438, 443, 444, 451, 426, 437; 251/30.03, 30.04, 45, 46, 126; 138/42, 44

[56] References Cited

U.S. PATENT DOCUMENTS

| | | |
|---|---|---|
| 2,588,555 | 3/1952 | Molloy . |
| 2,619,122 | 11/1952 | Hunter ............... 137/436 |
| 2,811,169 | 10/1957 | Buchanan ............... 137/414 |
| 3,459,403 | 8/1969 | Royer ............... 251/46 |
| 3,495,803 | 2/1970 | Schoepe et al. ............... 137/414 |
| 3,534,830 | 10/1970 | Kaila ............... 137/444 |
| 3,554,219 | 1/1971 | Hudson ............... 137/414 |
| 3,907,249 | 9/1975 | Persson ............... 251/126 |
| 3,994,313 | 11/1976 | Brandelli . |
| 4,072,164 | 2/1978 | Kaden ............... 137/414 |
| 4,258,746 | 3/1981 | Hudson ............... 137/414 |
| 4,596,269 | 6/1986 | Stephens ............... 137/444 |
| 4,613,111 | 9/1986 | Paquet et al. ............... 251/46 |

FOREIGN PATENT DOCUMENTS 1486601 9/1977 United Kingdom .
1532210 11/1978 United Kingdom .
1540082 2/1979 United Kingdom .

Primary Examiner—George L. Walton
Attorney, Agent, or Firm—Merchant & Gould Smith, Edell, Welter & Schmidt

[57] ABSTRACT

An hydraulically assisted inlet valve is disclosed having a by-pass passage (32) which is permanently open. Preferably the valve has a valve body (13) reciprocally mounted in the inlet (4) and carried by a diaphragm (23). The by-pass passage preferably extends through the valve body (13) to apply inlet pressure to one side of the diaphragm.

5 Claims, 5 Drawing Sheets

A VALVE ARRANGEMENT

The present invention relates to valve mechanisms and, in particular, to a valve mechanism for an hydraulically assisted inlet valve. Such inlet valves find use in cisterns or flush tanks.

Hydraulically assisted inlet valves are known and find particular use in cisterns having a relatively small maximum horizontal dimension, since in such cisterns the float arm is necessarily short and therefore the amount of force able to be delivered by the buoyancy forces applied to a float at the end of a short arm, are relatively limited. As a consequence, it is desirable to utilise the pressure of the inlet water to assist in closing the valve.

Known hydraulically assisted inlet valves have a seated valve orifice which opens from an inlet pipe into an outlet chamber. A diaphragm extends across the outlet chamber and thus divides the outlet chamber into first and second portions. The diaphragm is opposite the valve orifice and thus is arranged to close the valve orifice when the diaphragm moves towards the valve orifice.

The diaphragm is provided with a small aperture which is normally aligned with, and is closable by, a steel needle which is fixed relative to the outlet chamber.

Water at inlet pressure is able to pass through the aperture in the diaphragm thereby equalizing the pressure on either side of the diaphragm and allowing the diaphragm to move onto the needle and thereby close the aperture and simultaneously close the valve orifice. In order to open the valve, the pressure is released in the second outlet chamber portion thereby enabling the diaphragm to move under the influence of the inlet pressure away from the valve orifice.

The abovementioned arrangement suffers from a number of disadvantages, the most serious of which is that solids in the water to be introduced into the cistern can block the aperture in the diaphragm thereby preventing the aperture and needle functioning correctly. In addition, the needle is sometimes liable to rust which again causes the arrangement to malfunction.

It is the object of the present invention to provide an improved valve mechanism for such an hydraulically assisted inlet valve.

According to one aspect of the present invention there is disclosed a valve arrangement for an hydraulically assisted cistern inlet valve, said arrangement comprising an inlet leading into an outlet chamber divided into first and second portions by a diaphragm, said first portion being provided with a releasably closable pressure relief passage exiting to atmosphere and said second portion communicating with an outlet for said valve, and said inlet being closable by a valve body movable with said diaphragm, wherein a permanently open pressure transfer passage extends between said inlet and said first portion.

The valve body is axially elongate having a helical flow path about the exterior thereof for the flow of inlet flushing water from said inlet to said outlet for said valve. The valve body extends into said inlet with a small axial clearance therebetween, and is reciprocal within said inlet with the movement of said diaphragm to allow passage of inlet water from said inlet. The pressure transfer passage extends axially through said valve body from said first portion and has a radial portion extending to the exterior of the valve body to open via an opening in the exterior of said valve body into said small clearance at a point below the said helical flow path, said pressure transfer passage acting to influence movement of said diaphragm in opening and closing of the valve arrangement, said small clearance between said valve body and said inlet being less than the size of said opening. The small clearance thereby constitutes an inlet filter for said pressure transfer passage.

It is the valve body which is central to providing an improved hydraulic valve. It significantly reduces water hammer, provides a filter for water flowing through the valve and protects the pressure transfer hole form becoming blocked by solids.

Figure 2:
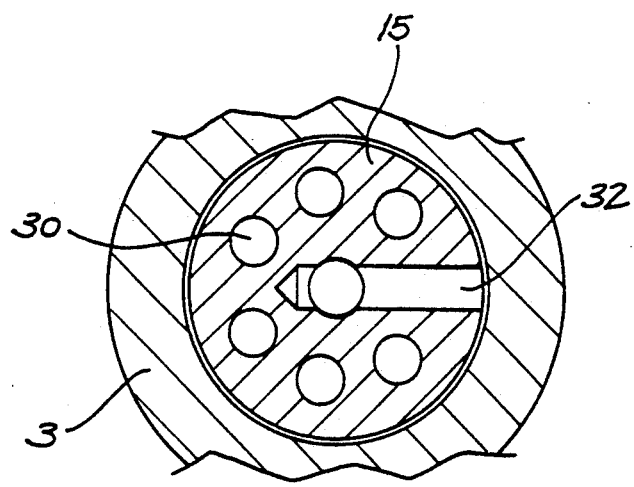
Figure 3:
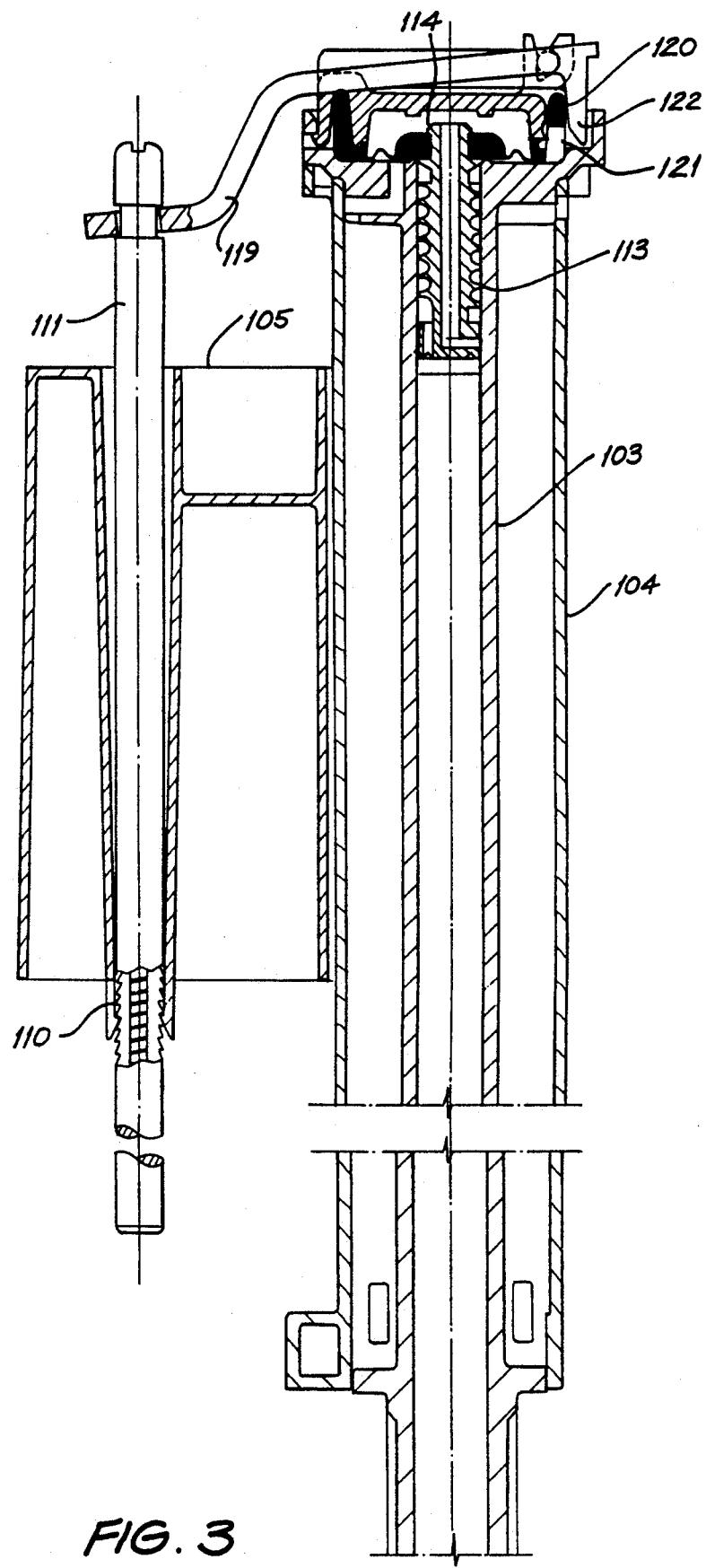
Figure 4:
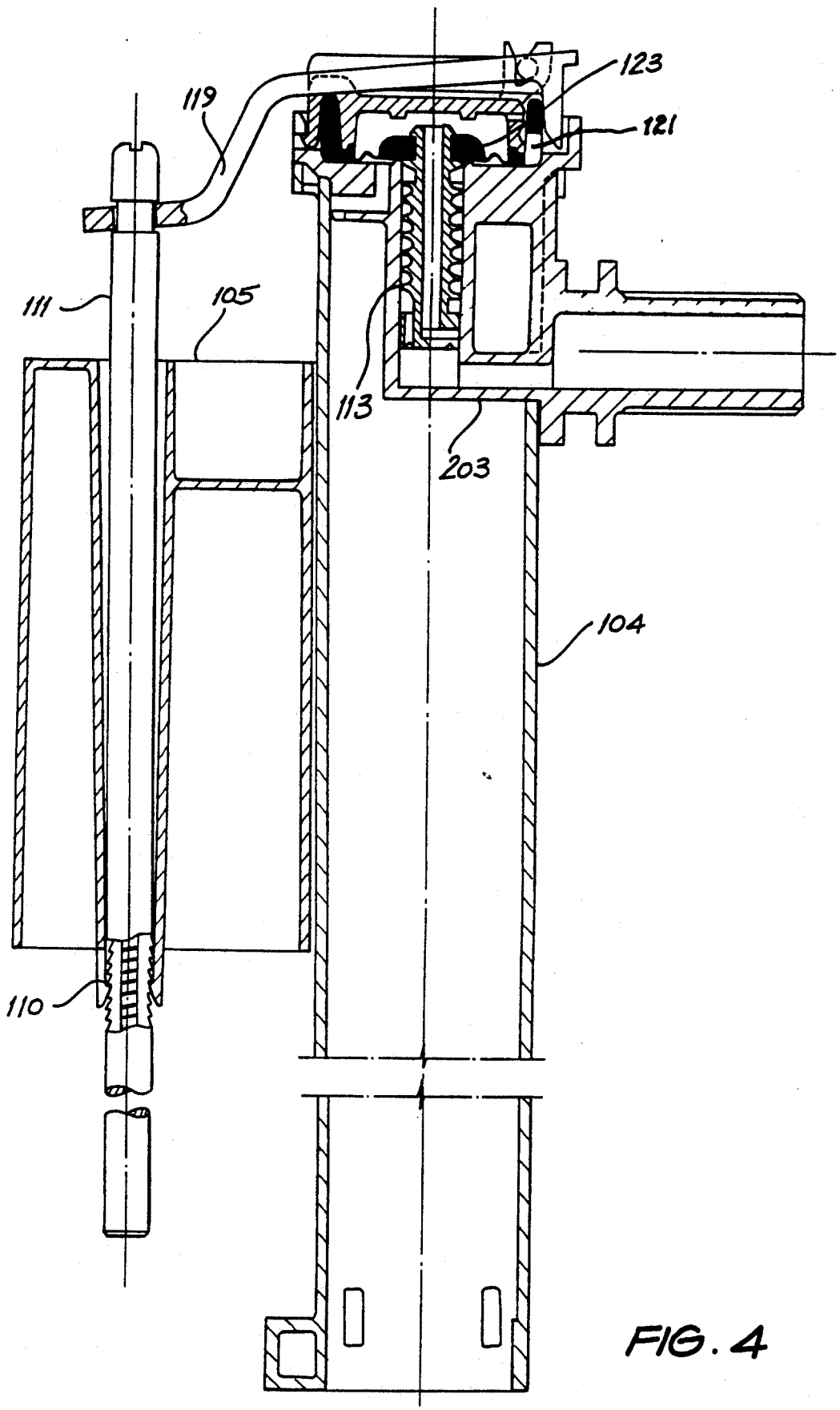
Figure 5:
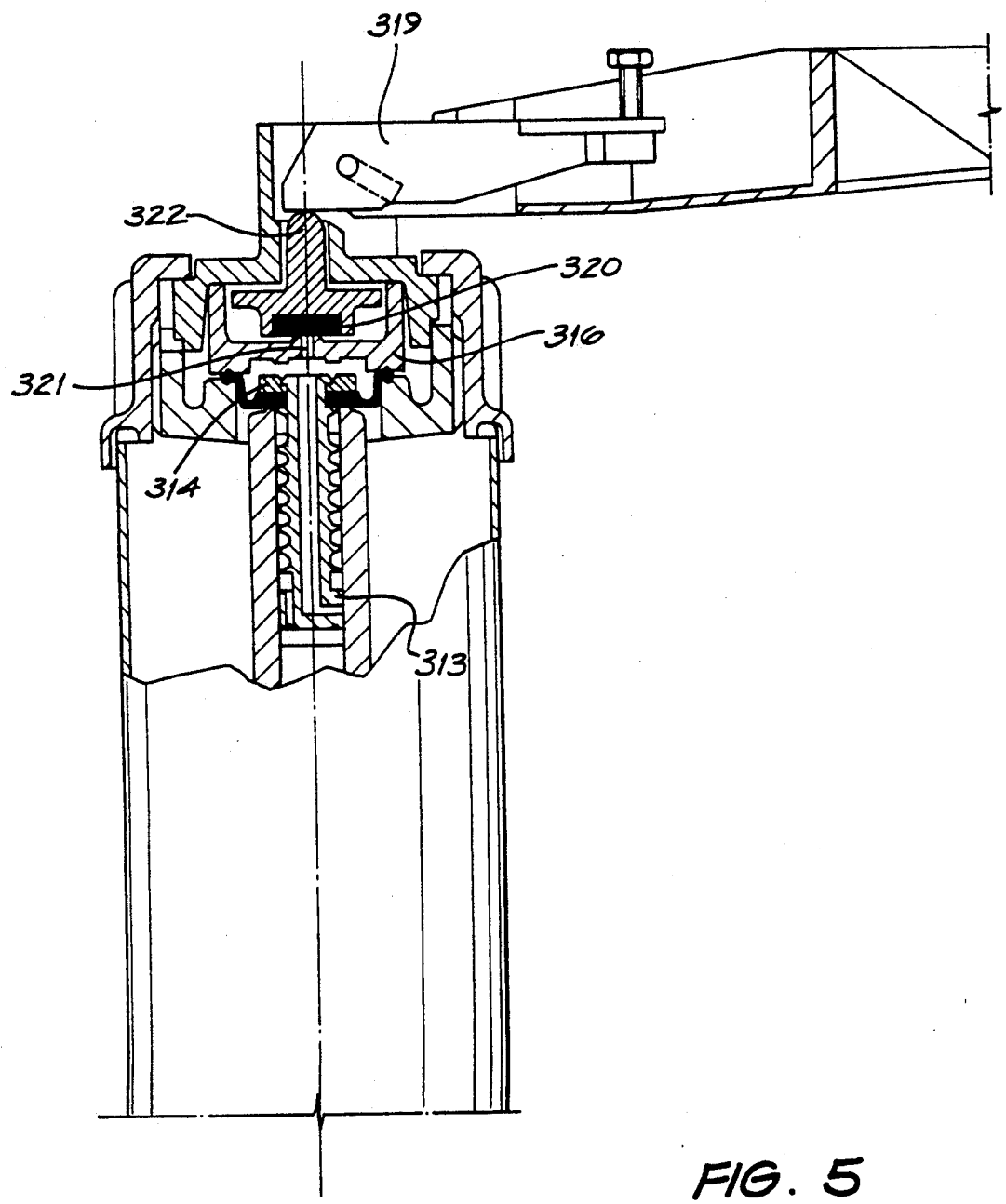

Four embodiments of the present invention will now be described with references to the drawings in which:

FIG. 1 is a longitudinal vertical cross section through the valve arrangement of the first embodiment, FIG. 2 is a horizontal cross section taken along the line II—II in FIG 1, FIG. 3 is a view similar to that of FIG. 1 but of a second, bottom entry, embodiment, FIG. 4 is a view similar to that of FIG. 3 but of a third, side entry, embodiment, and FIG. 5 is a further view similar to that of FIG. 1 but of a fourth embodiment.

As seen in FIG. 1, the valve 1 is located at the upper end of a stem 2 having concentrically arranged an inlet tube 3 and an outlet tube 4.

The upper end of the inlet 3 is formed into a valve seat 12. A valve body 13 of generally T-shaped configuration having a head 14 and stem 15 is arranged with the stem 15 slidingly engaged in the inlet tube 3.

Above the head 14 is a cap 16 which is held in place at the upper end of the stem 2 by a threaded locking ring 17. Positioned on the cap 16 is a pivot 18 for a float arm 19. The end of the float arm 19 adjacent the pivot 18 carries a rubber disc 20 which closes the end of a pressure relief passage 21 which passes through the cap 16.

Clamped between the cap 16 and the upper end of the stem 2 is a diaphragm 23 which surrounds the head 14 of the valve body 13. The inner annular portion of the diaphragm 23 mates with, and closes, the valve seat 12 whilst the next outer portion of the diaphragm 23 is configured into a bellows like arrangement of relatively thin wall cross-section. This arrangement therefore enables the diaphragm 23 to flex so as to allow the valve body 13 to move longitudinally relative to the inlet 3.

The space between the cap 16 and the upper end of the stem 2 constitutes an outlet chamber 24 which the diaphragm 23 divides into a first (upper) portion 25 and a second (lower) portion 26. The lower portion 26 of the outlet chamber 24 is tangentially inclined relative to the outlet tube 4 so as to cause the water which passes through the valve to spiral downwardly around the inside of the outlet tube 4 thereby providing for quiet operation.

As best seen in FIG. 2, the stem 15 of the valve body 13 is provided with a number of holes 30 which provide small passageways through the stem 15 and into a channel 31. The holes 30 constitute a filter which enables the water passing through the valve to be filtered before reaching the valve seat 12. The channel 31 communicates with a two start helix 33 which provides a measure of resistance to flow prior to valve seat 12.

Also located within the valve body 13 is an L-shaped pressure transfer passage 32 which enables the inlet pressure at the water inlet 3 to be transferred to the upper portion 25 of the outlet chamber 24.

The operation of the inlet valve arrangement will now be described from an initial position in which the valve 1 is closed. When flushing of the cistern commences, the water level within the cistern drops along with the float 5 and the float arm 19 pivots into the lower position illustrated by broken lines in FIG. 1. As a result, the rubber disc 20 is raised from the upper end of the pressure relief passage 21 thereby releasing the pressure in the first portion 25 of the outlet chamber 24. Hitherto the pressure in this first portion 25 had been inlet pressure communicated via the pressure transfer passage 32 from the inlet 3. Because the area of the head 14 contained in the first portion 25, was larger than the area of the head contained within the inlet 3, a net closing force was applied to the valve body 13 by the inlet pressure when present in the first portion 25.

However, with the release of this inlet pressure portion, the valve body 13 moves upwardly in the inlet 3 under the influence of the inlet pressure applied to the valve body 13. As a consequence, the diaphragm 23 moves away from the valve seat 12 so as to open the valve 1 and allow water to pass from the inlet tube 3 into the second portion 26 of the outlet chamber 24 from where it flow into the outlet tube 4.

At the cessation of the flushing action, the water begins to rise within the cistern thereby both raising the float 5 unto approximately the position illustrated by solid lines in FIG. 1, and also raising the float arm 19 into the position illustrated by solid lines in FIG. 1. As a consequence of the movement of the float arm 19, the rubber disc 20 closes the pressure relief passage 21 thereby applying inlet pressure to the first portion 25 of the outlet chamber 24. This inlet pressure applied to the head 14 moves the valve body 13 downwardly as seen in FIG. 1 so as to bring the diaphragm 23 into contact with the valve seat 12 and thereby close the valve 1.

The above described arrangement provides a number of advantages. Firstly, the pressure transfer passage 32 has its inlet substantially perpendicular to the direction of flow in the water inlet 3. Secondly, the pressure transfer passage 32 is shrouded by the close diametrical clearance between valve stem 15 and water inlet 3.

Thirdly, the pressure drop in pressure transfer passage 32 when pressure relief passage 21 is open to atmosphere, causes the valve body 13 to pivot or rock to the right as viewed in FIG. 1 about the diaphragm 23. This causes the valve body 13 to come into contact with the water inlet 3 bore at the point where the pressure transfer passage 32 has its inlet. As a consequence, the flow rate into the pressure transfer passage 32 is restricted and this substantially reduces the incidence of water hammer. Also, this close diametrical clearance between valve stem 15 and water inlet 3 when the pressure relief passage 21 is open to atmosphere prevents particles entering the pressure transfer passage 32. When the pressure relief passage 21 is no longer open to atmosphere, the valve body 13 pivots back to its original position as illustrated in FIG. 1. Thus any particles previously trapped between the valve body 13 and the water inlet bore, are then free to fall down the inlet under the influence of gravity. Finally, because the passage 32 (and passage 21) is/are larger than the valve body 13/inlet 3 clearance, any particle which does enter the passage 32 is free to pass therethrough without creating a blockage.

Fourthly, the small holes 30 formed between the channel 31 and inlet tube 3 constitute a filter which blocks the passage of any particles entrapped in the flow of incoming water. When the flow stops, these particles are free to fall downwardly into the inlet tube and thereby not clog the valve 1.

Turning now to FIG. 3, a second embodiment is illustrated in which like parts to the first embodiment are allocated a designation number increased by 100.

The inlet tube 103 and outlet tube 104 are substantially as before as is the valve body 113 save for a slightly modified head 114. The pressure relief passage 121 is horizontal rather than vertical and closed by a rubber member 120 compressible by a lug 122 on the float arm 119. The float 105 is secured by a ratchet mechanism 110 to a dropper 111 which extends from the float arm 119.

FIG. 4 illustrates a third embodiment similar to that of FIG. 3 save that the inlet 203 is substantially L-shaped to allow for side entry of water into the cistern (not illustrated) rather than bottom entry as in FIGS. 1-3.

FIG. 5 illustrates a fourth embodiment in which the pressure relief passage 321 is centrally located in the cap 316. The rubber disc 320 which closes the passage 321 is carried in the base of a T-shaped plunger 322. The plunger 322 is depressable by the float arm 319 as it pivots upwardly following filling of the cistern. The valve body 313 and its head 314 are similar to those of FIG. 1.

The foregoing describes only four embodiments of the present invention and modifications, obvious to those skilled in the art, can be made thereto without departing from the scope of the present invention.

We claim:

1. A valve arrangement for a hydraulically assisted flushing tank inlet valve, said arrangement comprising: an inlet leading into an outlet chamber divided into first and second portions by a diaphragm, said first portion being provided with a releasably closable pressure relief passage exiting to atmosphere, said second portion communicating with an outlet for said valve, said inlet being closable by a valve body movable by said diaphragm and said valve body including a permanently open pressure transfer passage extending between said inlet and said first portion, wherein said valve body is axially elongate having helical flow path about the exterior thereof for the flow of inlet flushing water from said inlet to said outlet for said valve, and extends into said inlet with a small axial clearance therebetween, and is reciprocal within said inlet with the movement of said diaphragm to allow passage of inlet water from said inlet; said pressure transfer passage extends axially through said valve body from said first portion and has a radial portion extending to the exterior of the valve body to open via an opening in the exterior of said valve body into said small clearance at a point below the said helical flow path, said pressure transfer passage acting to influence movement of said diaphragm in opening and closing of the valve arrangement, said small clearance between said valve body and said inlet being less than the size of said opening; wherein said small clearance constitutes an inlet filter for said pressure transfer passage.

2. An arrangement as claimed in claim 1, wherein a filter means for water passing through said inlet valve by said inlet to said outlet is carried by, and movable with, said valve body.

3. An arrangement as claimed in claim 2, wherein said filter means comprises a plurality of axial passageways extending from said inlet and in communication with said helical flow path.

4. A hydraulically assisted flushing tank inlet valve comprising: a valve arrangement including an inlet leading into an outlet chamber divided into first and second portions by a diaphragm, said first portion being provided with a releasably closable pressure relief passage exiting to atmosphere, said second portion communicating with an outlet for said valve, said inlet being closable by a valve body movable by said diaphragm and said valve body including a permanently open pressure transfer passage extending between said inlet and said first portion, wherein said valve body is axially elongate having a helical flow path about the exterior thereof for the flow of inlet flushing water from said inlet to said outlet for said valve, and extends into said inlet with a small axial clearance therebetween, and is reciprocal within said inlet with the movement of said diaphragm to allow passage of inlet water from said inlet; said pressure transfer passage extending axially through said valve body from said first portion and having a radial portion extending to the exterior of the valve body to open via an opening in the exterior of said valve body into said small clearance at a point below the said helical flow path, said pressure transfer passage acting to influence movement of said diaphragm in opening and closing of the valve arrangement, said small clearance between said valve body and said inlet being less than the size of said opening; whereby said small clearance constitutes an inlet filter for said pressure transfer passage.

5. A hydraulically assisted flushing tank inlet valve as claimed in claim 4, wherein said opening is aligned substantially normal to the direction of flow of liquid through said inlet.

* * * * *